Jan. 10, 1939.   E. F. MARTINET ET AL   2,143,201
SELF ALIGNING BEARING
Filed June 6, 1935   2 Sheets-Sheet 1

Inventors
Eugene F. Martinet and
Elmer J. Kasper
By Frease and Bishop
Attorneys

Jan. 10, 1939.　　　　E. F. MARTINET ET AL　　　2,143,201
SELF ALIGNING BEARING
Filed June 6, 1935　　　　2 Sheets-Sheet 2
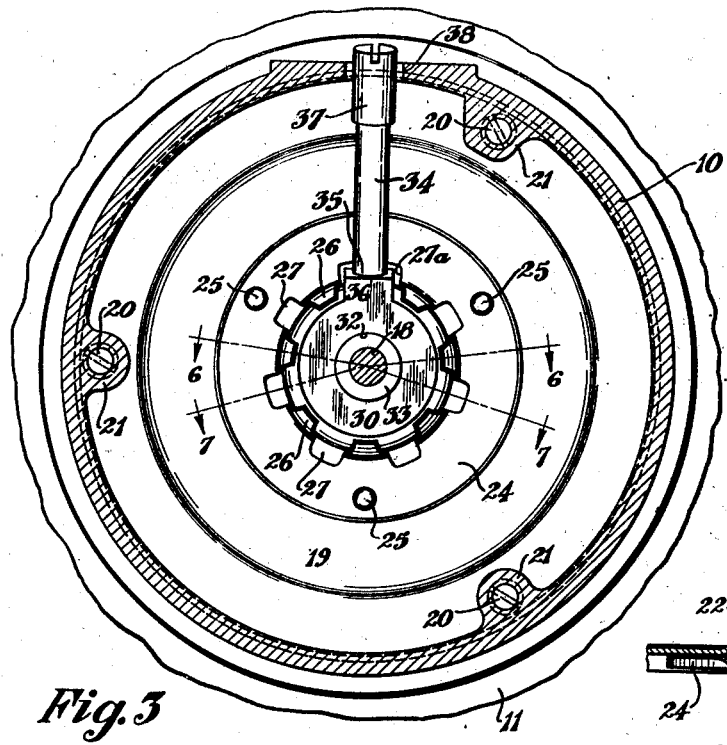
Fig. 3
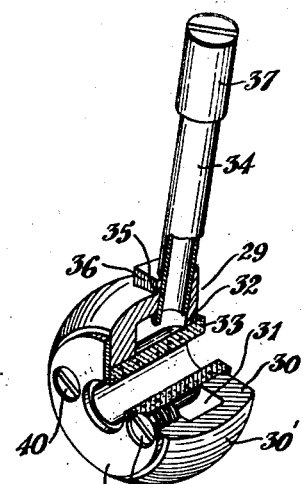
Fig. 5
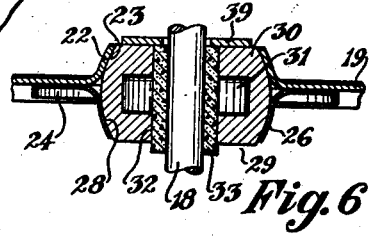
Fig. 6
Fig. 7
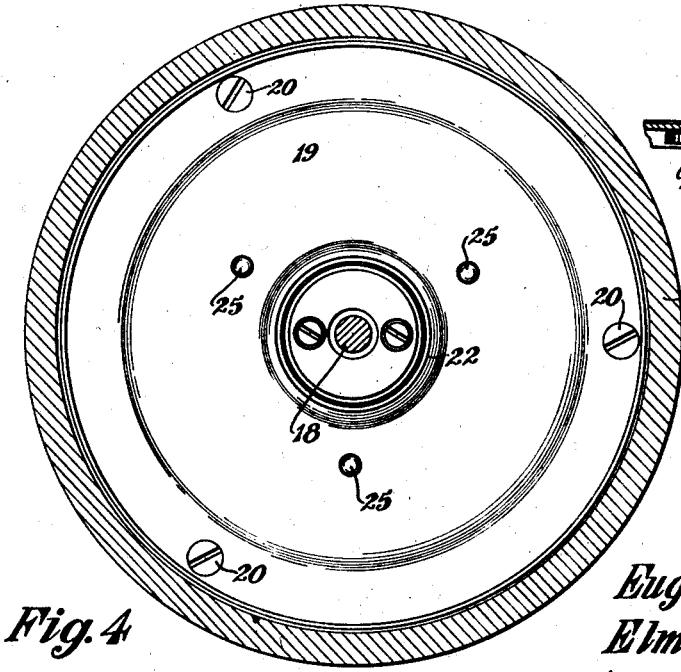
Fig. 4
Inventors
Eugene F. Martinet and
Elmer J. Kasper
By Frease and Bishop
Attorneys Patented Jan. 10, 1939

2,143,201

UNITED STATES PATENT OFFICE 2,143,201

SELF-ALIGNING BEARING

Eugene F. Martinet, Cleveland, and Elmer J. Kasper, East Cleveland, Ohio, assignors to The P. A. Geier Company, Cleveland, Ohio, a corporation of Ohio Application June 6, 1935, Serial No. 25,272

1 Claim. (Cl. 308—132)

REISSUED APR -2 1940

The invention relates to self-aligning bearings, and more particularly to a self-aligning bearing construction for the motor or rotor shaft of an electrically operated, portable, domestic or household suction cleaner having a motor driven fan, a suction nozzle and a dust bag, manipulated by a handle.

Substantially all portable household suction cleaners are electrically operated and include a motor having a rotor shaft upon which the suction fan is mounted. Bearings must be provided for the rotor shaft and these bearings must be lubricated in some manner. Difficulties have, however, been encountered in providing the proper lubrication for such bearings so that the lubricant need only be replenished infrequently, and so that the bearing lubrication is uniform without involving over-oiling and seepage.

These difficulties are greatly increased when a self-aligning bearing construction is involved, and it is highly desirable if not necessary, for smooth, uniform and efficient operation of a cleaner to provide a self-aligning bearing for the cleaner rotor shaft.

Ordinary bearing lubrication difficulties in a measure have been corrected by utilizing a porous, absorbent, sponge-like, metallic bearing material for journalling the rotor shaft; which bearing material absorbs, exteriorly thereof, oil or other lubricant from a reservoir supply and exudes the lubricant interiorly along its bore wherein the rotor shaft is journalled.

However, no prior self-aligning bearing construction has ever embodied porous absorbent, sponge-like, metallic, bearing material in a satisfactory manner without encountering the difficulties and dangers referred to above, the worst of which is over-oiling; and over-oiling cannot be tolerated in household suction cleaner construction, because seeping or dripping oil might quickly ruin articles being cleaned by the cleaner.

Accordingly, it is an object of the present invention to provide an improved self-aligning bearing construction for rotating shafts.

It is a further object of the present invention to provide a suction cleaner motor shaft with a self-aligning bearing construction, which may be properly lubricated without danger of over-oiling or oil seepage.

It is likewise an object of the present invention to provide a suction cleaner motor shaft with a self-aligning bearing construction, which may be lubricated uniformly and efficiently with only very infrequent replenishment of free lubricant.

Moreover, it is an object of the present invention to provide a suction cleaner motor shaft with a self-aligning bearing construction utilizing porous, absorbent, sponge-like, metallic, bearing material without, however, requiring a large amount of such bearing material, which is relatively expensive, to be used.

Another object of the present invention is to provide an improved self-aligning bearing construction in which the tension or pressure upon the self-aligning parts of the bearing is relatively small.

Furthermore, it is an object of the present invention to provide a self-aligning bearing construction having relatively few parts of simple and inexpensive construction in manufacture, assembly and use.

And finally, it is an object of the present invention to provide a self-aligning bearing construction, which avoids the described difficulties experienced in connection with the use of prior types of bearings, and which incorporates one or more of the advantageous characteristics or desiderata set forth above.

These and other objects may be obtained by the self-aligning bearing constructions, parts, elements and combinations, preferred embodiments of which are shown in the accompanying drawings and are hereinafter described in detail and claimed, which may be stated in general terms as preferably including in self-aligning bearing construction for a rotating shaft, a bearing plate or base, a bearing housing member universally journalled under tension on the plate or base, a bearing sleeve of porous, absorbent, sponge-like, metallic, bearing material mounted in said housing, a shaft journalled in said sleeve, said housing being provided with a compartment communicating with the exterior of said sleeve forming a lubricant reservoir, and means for introducing free lubricant into said reservoir.

In the drawings,

Fig. 3 is a cross section taken on the line 3—3, Fig. 2;

Fig. 4 is a cross section similar to Fig. 3, taken on the line 4—4, Fig. 2;

Fig. 5 is a perspective view of certain of the improved bearing parts shown in Figs. 2, 3 and 4, with a quarter portion thereof in section;

Fig. 6 is a fragmentary sectional view, taken on the line 6—6, Fig. 3;

Fig. 7 is a view similar to Fig. 6, but taken on the line 7—7, Fig. 3; and

Similar numerals refer to similar parts throughout the various figures of the drawings.

Figures 1, 2, 8:
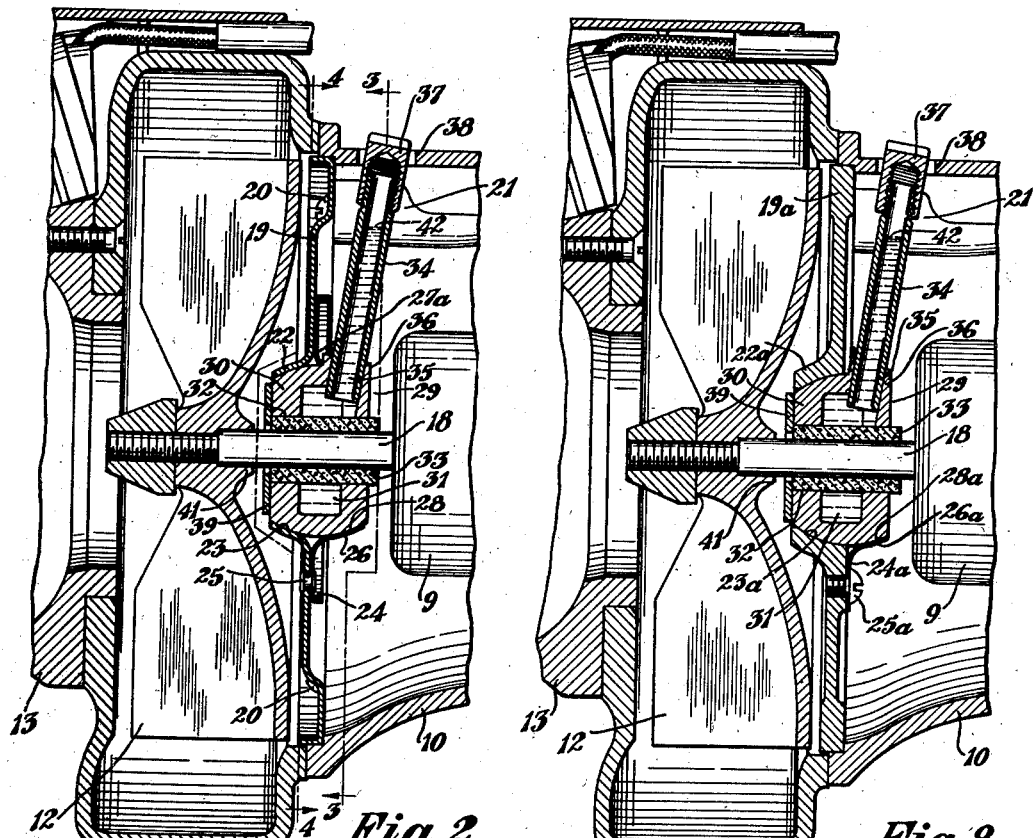
Figure 1 is a fragmentary side elevation of an electrically-operated, portable, suction cleaner equipped with one form of improved self-aligning bearing construction.
Fig. 2 is an enlarged fragmentary vertical sectional view of certain portions of the suction cleaner shown in Fig. 1, showing one form of improved self-aligning bearing construction.
Fig. 8 is a view similar to Fig. 2, showing a slightly modified form of improved self-aligning bearing construction.

A usual type of electrically operated portable suction cleaner is shown in Fig. 1, which may comprise a motor 9 in a motor housing 10, provided with a fan housing 11, having a fan 12 therein, and a suction nozzle 13 communicating with the fan housing 11. An operating handle 14 and a dust bag (not shown) connected with the exhaust opening of the fan housing 11, are also provided for the cleaner; and the motor housing 10, the fan housing 11 and nozzle 13 are mounted on front casters 15, and a preferably adjustable rear caster 16 for ambulant motion over a floor or the like indicated at 17.

One embodiment of the improved self-aligning bearing construction is best illustrated in Figs. 2 to 7, inclusive, and the same forms a bearing support for the motor shaft 18 of the motor 9, on which the fan 12 is mounted.

The improved self-aligning bearing support preferably includes a bearing plate or base member 19, which is preferably mounted on and secured to the motor housing 10 by screws or the like 20, engaging in lugs or bosses 21 formed on the motor housing. The bearing plate or base member 19 is provided centrally thereof with a neck 22 having an inner spherical surface 23.

A spring metal retaining disk or member 24 is secured to the plate or base member 19 around the neck 22 thereof, preferably by rivets 25; and the member 24 is also provided with a discontinuous neck formed by a series of tangs or fingers 26 with intervening cut-out portions 27. The inner surfaces of the tangs or fingers 26 are also spherically formed as indicated at 28 in continuation of the spherical inner surface 23 of the plate neck 22.

A bearing housing member generally indicated at 29 in Fig. 5 is provided with a housing portion 30 having an outer spherical surface 30'; and the housing portion 30 is universally journalled within the spherical surfaces 23 and 28 formed on the neck 22 and spring tangs 26 before the retaining member 24 is secured to the plate or base member 19, so that the spring tangs provide a resilient journal mounting for the housing 30.

The housing portion 30 is provided with an internal preferably annular, recess 31, and a preferably cylindrical bore 32; and a bearing sleeve 33 formed of porous, absorbent, sponge-like, metallic, bearing material, which is pressed into the bore 32 of the housing portion 30. When the bearing sleeve 33 is assembled in the bearing housing member 29, an annular compartment is formed within the housing portion 30, which serves as a lubricant reservoir; and a short pipe 34 is preferably mounted on the housing portion 30 by pressing the end 35 thereof into a bored boss 36, with which the housing portion 30 is provided; whereby the pipe 34 provides means for introducing free lubricant into the reservoir.

Referring to Fig. 3, the two upper adjacent tangs or fingers 26 on the retaining member 24 are preferably spaced wider apart by a notch 27a than the remaining tangs so as to receive and clear the boss 36; and the upper end of the lubricant filling pipe 34 is preferably provided with a screw cap 37 projecting outwardly through an aperture 38 in the upper surface of the motor housing 10, whereby the screw cap 37 may be readily removed when desired for introducing free lubricant into the filling pipe 34 and thence to the lubricant reservoir within the housing portion 30.

The fan end of the self-aligning bearing is preferably provided with a protecting plate 39 secured to the housing portion 30 by screws 40 and partially covering the fan end of the bearing sleeve 33 so as to protect the same from thrust which may result if the hub 41 of the fan 12 moves to the right when viewing Fig. 2.

The embodiment of the invention shown in Fig. 8, is the same as that shown in Figs. 1 to 7 inclusive, excepting that the plate or base member 19 of Fig. 2 is made of pressed sheet metal, while the plate or base member 19a shown in Fig. 8, is made of cast metal. The member 19a is preferably mounted on and secured to a motor housing 10 by screws or the like engaging lugs or bosses 21 formed on the motor housing; and the bearing plate or base member 19a is provided centrally thereof with an integral neck 22a having an inner spherical surface 23a.

A spring metal retaining disk or member 24a is secured to the plate or base member 19a around the neck 22a thereof, preferably by screws 25a, and the member 24a is also provided with a discontinuous neck formed by a series of tangs or fingers 26a with intervening cut-out portions. The inner surfaces of the tangs or fingers 26a are spherically formed as indicated at 28a in continuation of the spherical inner surface 23a of the plate neck 22a.

The bearing housing member generally indicated at 29 in Fig. 5, may be universally journaled within the spherical surfaces 23a and 28a; and the construction shown in Fig. 8 functions in the same manner as that shown in Fig. 1.

As stated, the bearing sleeve 33 is formed of a porous, absorbent, sponge-like, metallic bearing material, which may be anyone of a number of such bearing materials sold under trade names as "Compo" or "Durex", and comprises powdered copper, tin, graphite and/or other substances molded in the form of the desired bearing and then heat treated. Such bearing materials are porous throughout and will soak up approximately 40% by volume of free lubricant such as oil, light grease and the like. The bearing material therefore is termed herein, porous, absorbent, sponge-like, metallic bearing material and is sometimes referred to herein and in the claim as metallic sponge bearing material.

The function of the metallic sponge bearing 33 is to soak up or absorb free lubricant from a source or reservoir, and as the shaft 18 rotates therein, the center bore of the bearing 33 heats up, causing free lubricant in the pores thereof to flow out along the shaft and lubricate the same.

Metallic sponge bearing materials have been used in self-aligning bearings, by molding the same with an outer spherical shape; but when so molded and mounted, it is difficult if not impossible to seal any free lubricant around the metallic sponge bearing. Moreover, metallic sponge bearing materials are quite expensive and if bearings are made thereof with a spherical outer surface, a relatively large amount of bearing material is used which increases the cost thereof without providing a self-aligning bearing which may be lubricated for an extended period of time without danger of overoiling and seepage.

On the other hand, the present invention provides a self-aligning bearing in which an enclosure is formed with a free lubricant compartment and has a metallic sponge bearing pressed therein so as to seal the free lubricant within the compartment; and in which the enclosure is resiliently journaled for universal movement.

Moreover, the spherical exterior 30' of the bearing housing portion 30 is relatively large, as compared with a similar spherical exterior formed on a molded metallic sponge bearing in accordance with prior practice, so that the retaining disk tang yielding spring pressed mounting for the bearing housing portion is also relatively large. Thus, the yielding mounting for the bearing housing portion is very stable and at the same time involves only relatively small spring pressures between the spherical surfaces 23, 28 and 30'.

A considerable amount of free lubricant may be placed in the compartment reservoir 31 and the filling tube 34, as shown by the fluid level indicated at 42 in each of Figs. 2 and 8, so that the improved self-aligning bearings may be operated for months or even years without replenishment of free lubricant. Moreover, although the improved self-aligning bearing construction has been shown as applied to the motor shaft of a suction cleaner between the fan and motor rotor, it is to be understood that the improved self-aligning bearing construction may be utilized for journalling rotating shafts at other places in a suction cleaner construction, or in other devices where self-aligning bearings are desired.

Accordingly, the present invention provides an improved self-aligning bearing construction for rotating shafts which may be properly, uniformly and efficiently lubricated with only very infrequent replenishments of free lubricant but without danger of overoiling or oil seepage; provides a construction which is relatively inexpensive in manufacture, assembly and use; provides a construction which includes a yielding mounting wherein the tension or pressure upon the self-aligning parts is relatively small; and provides a self-aligning bearing construction avoiding the difficulties experienced in connection with the use of prior types of self-aligning bearings.

We claim:—

Self-aligning bearing construction for the motor shaft of a suction cleaner including a bearing plate having a neck provided with a spherical surface, a spring metal retaining disk having spaced fingers provided with spherical surfaces, a bearing housing formed with an exterior spherical surface resiliently journaled within said neck and finger spherical surfaces, a porous metal bearing sleeve mounted in said housing for journaling the shaft, means for supplying free lubricant to the bearing sleeve, and protecting means mounted on the housing covering the end of the bearing element on the opposite side of the plate from the disk, whereby the bearing sleeve is protected from thrust on the shaft toward said protecting means and whereby such thrust is absorbed by said spring disk fingers.

EUGENE F. MARTINET.
ELMER J. KASPER.